Jan. 4, 1927.
T. B. LEMAN
SANITARY MILKING HARNESS
Filed May 26, 1926
1,613,177
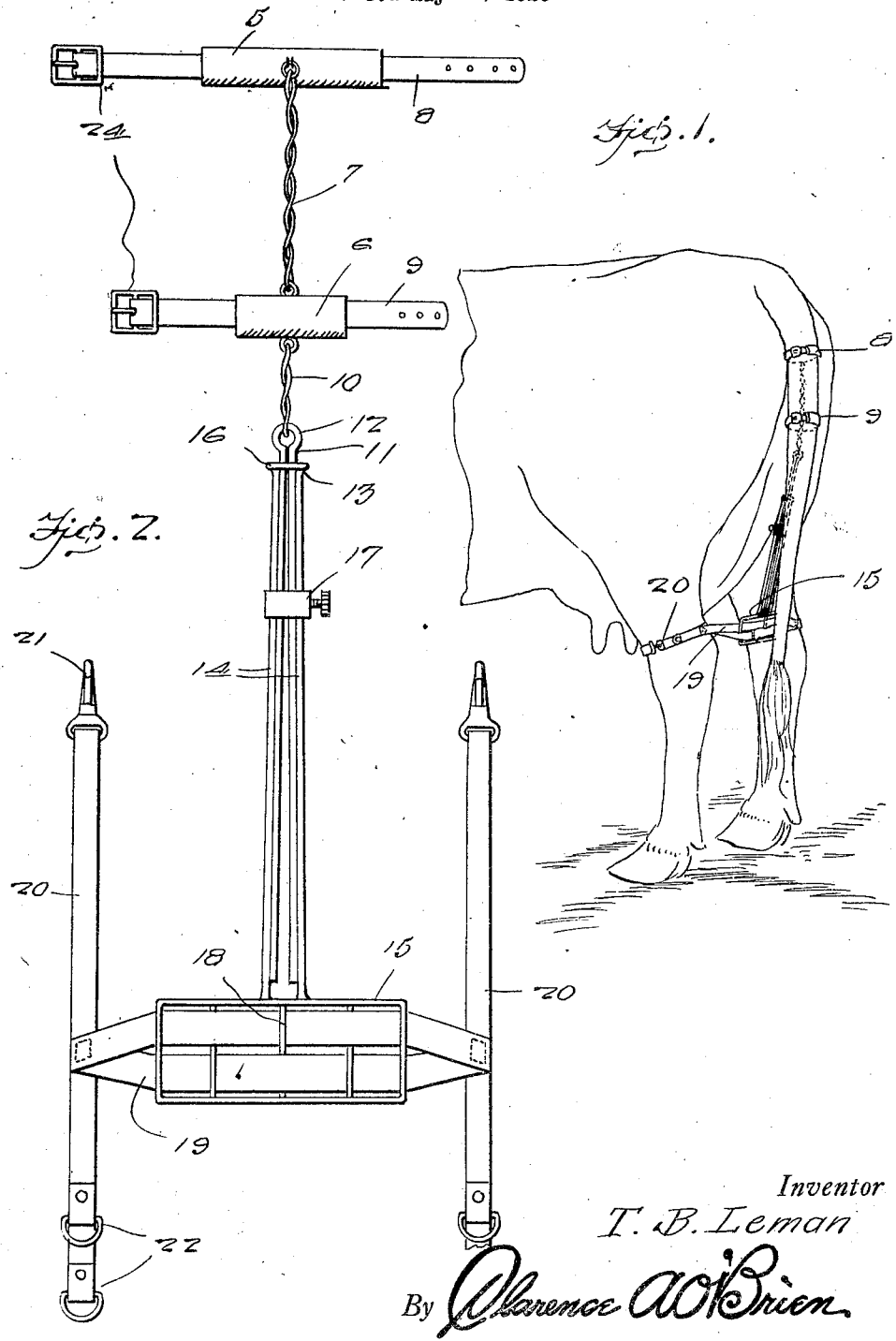
Inventor
T. B. Leman
By Clarence A. O'Brien
Attorney Patented Jan. 4, 1927.

1,613,177

UNITED STATES PATENT OFFICE.

TILDA B. LEMAN, OF RAPID CITY, SOUTH DAKOTA.

SANITARY MILKING HARNESS.

Application filed May 26, 1926. Serial No. 111,734.

The present invention relates to a sanitary milking harness for cows and has for its principal object to provide a contrivance which prevents the cow from kicking, switching her tail, or committing other annoyances while being milked.

Another very important object of the invention is to provide a contrivance of this nature which may be easily and quickly attached to and detached from the cow, and may be adjusted to fit different sized cows.

A still further very important object of the invention is to provide a contrivance of this nature which is exceedingly simple in its construction, strong and durable, efficient and reliable, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a perspective view of the contrivance embodying the features of my invention, showing the same on a cow, and Fig. 2 is an enlarged plan view of the contrivance.

Referring to the drawing in detail, it will be seen that flexible sleeves 5 and 6 are connected by wire strands 7, and have straps 8 and 9 projected therethrough respectively. Buckles 24 are attached on the ends of the straps 8 and 9. A member 11 is bent over upon itself to provide an eye 12 with which is engaged twisted strands of wire 10 attached to the flexible sleeve 6. A member 13 includes a pair of side rods 14 attached to a rectangular frame 15, one to each side of the member 11, and the upper end terminates in an eye 16 through which the member 11 projects.

A clamp 17 is disposed about the members 11 and 13 so that they may be held in different adjusted positions in relation to each other for lengthening and shortening the contrivance in accordance with the size of the cow. The rectangular frame 15 is provided with a plurality of crosspieces 18, and a continuous strap 19 is passed in and out through these cross pieces 18 and attached to a pair of straps 20 having suitable fastening elements 21 and 22 on the ends thereof.

To attach this contrivance to a cow, the clamp 17 is loosened. The strap 8 is first fastened about the tail say about six inches from the body, and then the strap 9 is attached around the tail the length of the wires 7 from the strap 8. The clamp 17 is tightened so that the frame 15 is located just above the hock joints of the cow, and then the straps 20 are engaged about the rear legs just above the hock joints. When the cow is thus harnessed, it will be apparent that she is prevented from switching her tail and kicking or committing any other nuisance which would prove detrimental to sanitary milking.

It will be apparent that the device is capable of being adjusted to fit practically all sizes of cows, and is capable of being quickly and easily attached to or detached from the cow. The structure is exceedingly simple and is thoroughly reliable and efficient when used for carrying out the ends of the invention.

The present embodiment of the invention has been disclosed in detail merely by way of example, since in actual practice it attains the features of advantage enumerated as desirable in the statement of the invention and the above description. It is apparent that numerous changes in the details of construction, and in the combination and arrangement of parts may be resorted to without departing from the spirit or scope of the invention as hereinafter claimed or sacrificing any of its advantages.

Having thus described my invention, what I claim as new is:—

1. A device of the class described including a frame, a pair of straps, means for mounting the straps on the frame, an adjustable member engaged on the frame, a flexible member engaged with the adjustable member, and a pair of straps engaged on the flexible member.

2. A device of the class described including, in combination, a rectangular frame having a plurality of cross pieces, a continuous strap loop interwoven between the cross pieces, a pair of straps attached to the loop strap, fastening elements on the pair of straps, an adjustable member attached to the frame, a flexible member attached to the adjustable member, and a pair of straps attached in spaced relation to the flexible member.

3. A contrivance of the class described including, in combination, a frame, a plurality of cross pieces in the frame, a continuous looped strap having portions thereof trained back and forth between the cross pieces, a pair of straps having intermediate portions fixed to the loop strap, fastening elements on the ends of the pair of straps, a member attached to the frame including a pair of bars having an eye at their outer ends, a second member bent over upon itself to extend through the eye and between the bars, a flexible element attached to the second member, a flexible sleeve attached to the flexible element, a second flexible element attached to the flexible sleeve, a second flexible sleeve attached to the second flexible element, and a pair of straps one trained thru each flexible sleeve.

In testimony whereof I affix my signature.

Mrs. TILDA B. LEMAN.